(12) United States Patent
Shirk et al.

(10) Patent No.: US 10,160,333 B2
(45) Date of Patent: Dec. 25, 2018

(54) BACKUP POWER SYSTEM FOR RAILROAD POWER UNITS

(71) Applicant: Herzog Railroad Services, Inc., St. Joseph, MO (US)

(72) Inventors: Tony Shirk, Clarksdale, MO (US); Jared Noyes, Agency, MO (US)

(73) Assignee: Herzog Railroad Services, Inc., St. Joseph ( * ) Notice: Subject to any disclaimer, the term of this patent is extended or adjusted under 35 U.S.C. 154(b) by 387 days.

(21) Appl. No.: 14/988,258

(22) Filed: Jan. 5, 2016

(65) Prior Publication Data

US 2016/0193928 A1  Jul. 7, 2016

Related U.S. Application Data

(60) Provisional application No. 62/100,616, filed on Jan. 7, 2015.

(51) Int. Cl.
*B60L 11/04* (2006.01)
*B60L 11/12* (2006.01)

(52) U.S. Cl.
CPC ............... *B60L 11/12* (2013.01); *B60L 11/04* (2013.01); *Y02T 10/7077* (2013.01)

(58) Field of Classification Search
CPC .................................. B61L 11/04; B61L 11/12
See application file for complete search history.

(56) References Cited

U.S. PATENT DOCUMENTS

| | | | | |
|---|---|---|---|---|
| 4,853,553 | A * | 8/1989 | Hosie | B60L 1/003 290/40 C |
| 7,891,302 | B2 * | 2/2011 | Bachman | B60L 1/003 105/35 |
| 8,196,518 | B2 | 6/2012 | Bachman | |
| 8,550,009 | B2 * | 10/2013 | Geraud | B60L 1/006 105/35 |
| 8,772,962 | B2 * | 7/2014 | Kumar | B60L 1/00 105/35 |
| 2010/0070117 | A1 * | 3/2010 | Siffert | B61C 5/00 701/19 |
| 2013/0152815 | A1 | 6/2013 | Kanda | |
| 2014/0033945 | A1 * | 2/2014 | Foege | B61C 7/04 105/35 |
| 2014/0060378 | A1 * | 3/2014 | Daigle | B60L 11/02 105/35 |
| 2016/0193928 | A1 * | 7/2016 | Shirk | B60L 11/12 105/27 |

FOREIGN PATENT DOCUMENTS

EP           1555185           7/2005

* cited by examiner

*Primary Examiner* — Jason C Smith
(74) *Attorney, Agent, or Firm* — Erickson Kernell IP, LLC; Kent R. Erickson

(57) ABSTRACT

A backup power system for a railroad power unit includes an emergency backup generator that enables continuous operation of both traction motors and accessories on the power unit when a main generator and/or an accessory power unit (APU) become inoperable. The backup generator can provide power to accessories on the railcar when the APU becomes inoperable and when power provided by the APU is diverted to the traction motors due to the main generator becoming inoperable.

14 Claims, 7 Drawing Sheets

BACKUP POWER SYSTEM FOR RAILROAD POWER UNITS

CROSS-REFERENCE TO RELATED APPLICATIONS

This application claims the benefit of U.S. Provisional Patent Application No. 62/100,616, filed Jan. 7, 2015, the disclosure of which is hereby incorporated herein in its entirety by reference.

BACKGROUND

Power units that drive rail-bound cars along a set of tracks are commonly driven by electric traction motors. A diesel-powered engine (main engine) is provided on the power unit to drive a main generator that produces the electricity used by the traction motors. Other electrical components and accessories, such as air compressors, cooling fans, heating/ventilation/air-conditioning (HVAC) units, and control systems on the power unit and on other railcars coupled thereto are powered by an accessory power unit (APU). The APU typically includes a dedicated diesel- or gas-powered engine and an auxiliary generator driven thereby such that the APU can operate independently from the main engine. In some of these systems, power from the APU can be diverted from the accessories to the traction motors in case of main generator failure. It is also known to employ the main engine to drive the auxiliary generator for the accessories rather than utilizing an APU with a separate dedicated engine.

Problems exist with the known power unit configurations. For example, when the main engine is employed to drive the auxiliary generator, failure of the auxiliary generator leaves the power unit with no accessory power; and failure of the main generator leaves the power unit immobile. Because many of the accessories are required in order to operate the power unit, either failure can prevent further operation. In configurations utilizing an APU with a dedicated engine and generator, accessory power is lost if the APU fails. In the event of a main engine failure or main generator failure, the power output of the APU can be diverted to power the traction motors. In either configuration, the power unit is at best left without accessory power and at worst left without any power. There is a need in the art for a power unit configuration and system that provides backup power for both traction motors and accessories during failure of the main generator and/or the auxiliary generator.

SUMMARY

Embodiments of the invention are defined by the claims below, not this summary. A high-level overview of various aspects of the invention is provided here to introduce a selection of concepts that are further described in the Detailed-Description section below. This summary is not intended to identify key features or essential features of the claimed subject matter, nor is it intended to be used in isolation to determine the scope of the claimed subject matter. In brief, this disclosure describes, among other things, a backup power system for a railroad power unit.

The backup power system includes an emergency backup generator that enables provision of power to traction motors and to accessories on the power unit during periods of inoperability of a main generator, and/or an accessory power unit (APU) of the railroad power unit. During failure of the main generator, the backup generator is configured to take over the provision of power to accessories on the power unit while power provided by the APU is diverted to at least partially power the traction motors. The emergency backup generator can also power the accessories to take the place of the APU when the APU is inoperable. Accordingly, the backup power system is configured to enable operation of the power unit during failure or breakdown of the components of the primary power system.

DESCRIPTION OF THE DRAWINGS

Illustrative embodiments of the invention are described in detail below with reference to the attached drawing figures, and wherein.

DETAILED DESCRIPTION

The subject matter of select embodiments of the invention is described with specificity herein to meet statutory requirements. But the description itself is not intended to necessarily limit the scope of claims. Rather, the claimed subject matter might be embodied in other ways to include different components, steps, or combinations thereof similar to the ones described in this document, in conjunction with other present or future technologies. Terms should not be interpreted as implying any particular order among or between various steps herein disclosed unless and except when the order of individual steps is explicitly described. The terms "about" or "approximately" as used herein denote deviations from the exact value by +/−10%, preferably by +/−5% and/or deviations in the form of changes that are insignificant to the function.

Figure 1:
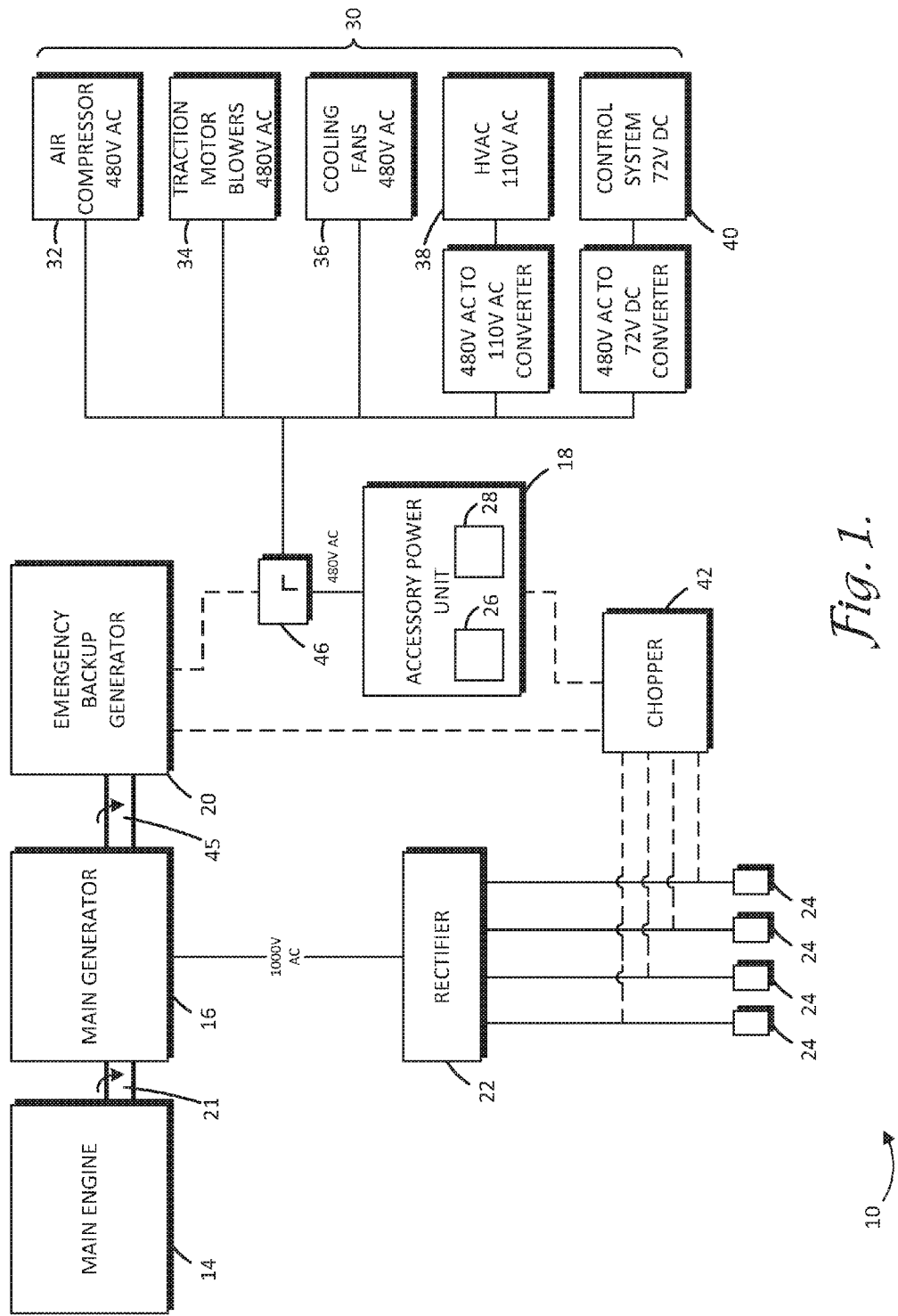
FIG. 1 is a schematic diagram of a backup power system of a railroad power unit operating in a normal operational state depicted in accordance with an embodiment of the invention.
Figure 2:
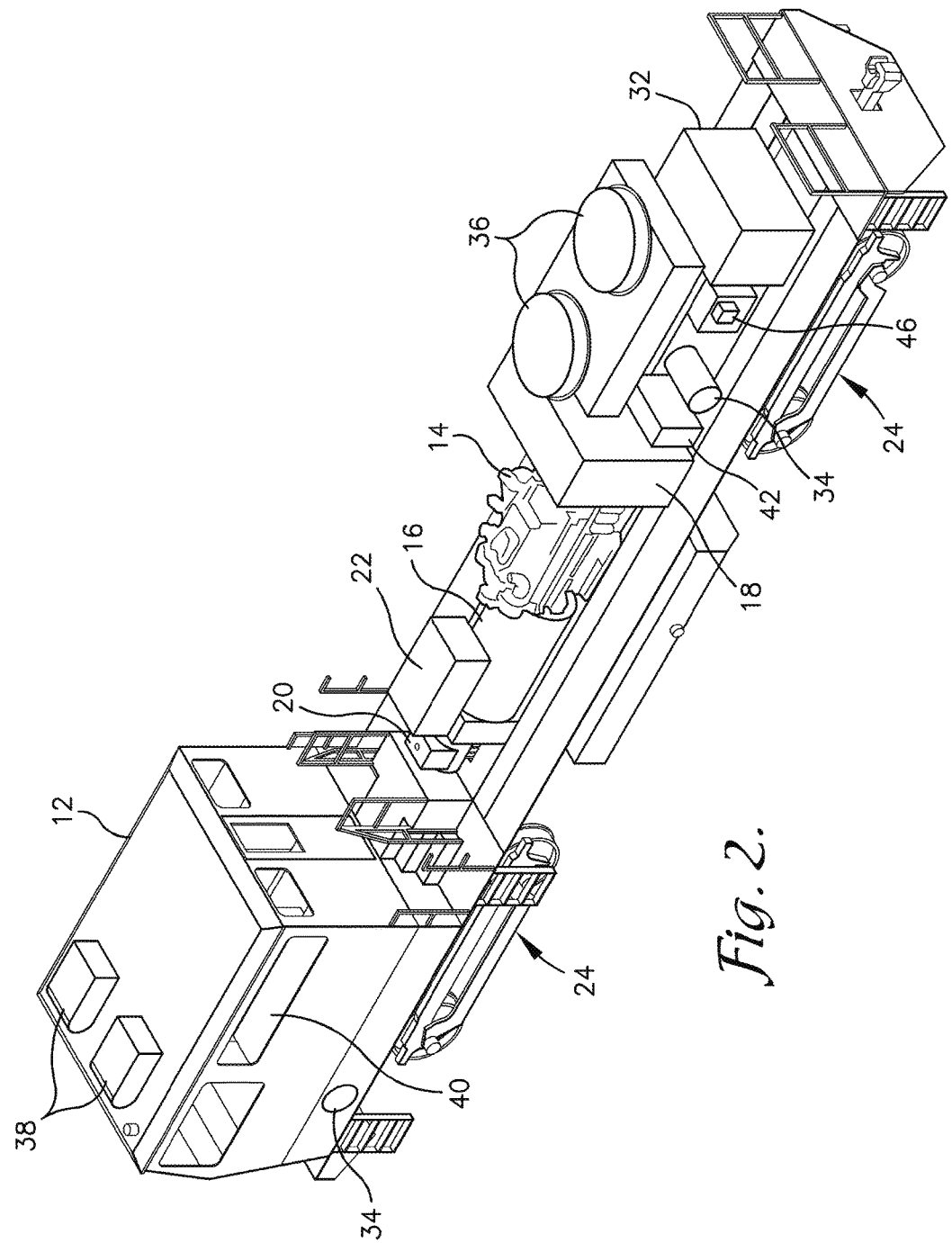
FIG. 2 is an illustrative perspective view of a power unit with a backup power system shown with an engine cowling removed for illustrative purposes and depicted in accordance with an embodiment of the invention.

With reference to FIGS. 1-2, a backup power system 10 for a power unit 12 is described in accordance with an embodiment of the invention. An exemplary power unit 12 is depicted in FIG. 2 and described herein to illustrate an embodiment of the backup power system 10. The power unit 12 is a power unit useable for propulsion of vehicles, cars, carriages, and the like along a set of rails or tracks, such as, for example, those employed for maintenance operations.

The power unit 12 includes a primary power supply system comprised of a main engine 14, a main generator 16, and an accessory power unit (APU) 18 and a backup or secondary power supply system that includes an emergency backup generator 20. The main engine 14 and the main generator 16 are configured in a conventional manner. For example, the main engine 14 comprises an internal combustion engine, such as a diesel- or gas-powered engine, configured to rotate at least one drive shaft 21 which is coupled to the main generator 16. Thereby, the main generator 16 is driven via the drive shaft 21 to generate electricity. The power produced by the main generator 16 is typically provided as an alternating current (AC) that is routed through one or more rectifiers 22 to convert to direct current (DC) which is then supplied to one or more DC traction motors 24 for propulsion of the power unit 12.

The APU 18 includes a generator 26 that is driven by a separate secondary engine 28. The APU 18 provides electrical power for operation of accessories 30 disposed on the power unit 12 and/or on other cars coupled thereto. The accessories 30 may include equipment such as air compressors 32, traction motor blowers 34, cooling fans 36, HVAC components 38, and control systems 40 for operation of the power unit 12 and components thereon, among a variety of other accessories 30 that can be employed.

The APU 18 can be electrically coupled to the traction motors 24 to provide electrical power to operate the traction motors 24 when the main generator 16 is unable to do so. The APU 18 may be configured to fully power the traction motors 24 for operation thereof at or near normal operational levels, or the APU 18 may power the traction motors 24 at a reduced level, e.g. 25-50% of normal. For example, in one embodiment, the main generator 16 provides about 1000V AC for operation of the traction motors 24 while the APU 18 provides 480V AC which can be directed to the accessories 30, to the traction motors 24, or shared therebetween. As such, the traction motors 24 can be operated at sufficient levels, e.g. at least at a reduced speed, to return the power unit 12 to a location at which maintenance can be performed on the non-operational main engine 14 or main generator 16. One or more choppers 42, chopper circuits, or similar components may be provided between the APU 18 and the traction motors 24 to, for example, convert an AC current provided by the APU 18 to a DC current useable by the traction motors 24.

The emergency backup generator 20 is configured to provide backup power for the accessories 30 as needed, e.g. when the APU 18 is non-operational or when the main generator 16 is non-operational and power from the APU is diverted to the traction motors. The backup generator 20 is driven by the main engine 14 via a main drive shaft 21 of the main generator 16, which has an input end thereof connected to the main engine 14. For example, the backup generator 20 may be directly connected to an output end 45 of the main shaft 21. It is foreseen, however, that the backup generator can be driven by the main engine 14 via a secondary drive shaft or the like (not shown) extending from a gearbox associated with the main engine 14 or the main generator 16, among other configurations.

The backup generator 20 is electrically coupled to the accessories 30 and may be coupled to the traction motors 24. A transfer switch 46 may be provided between the backup generator 20, the accessories 30, and the APU 18 to enable provision of power to the accessories 30 to be switched between the backup generator 20 and the APU 18. In an embodiment, the backup generator 20 provides about 480V AC for use by the accessories 30 or the traction motors 24 or that can be shared between the accessories 30 and the traction motors 24.

Operation of the backup power system 10 is now described with respect to several fault or break-down conditions that may occur on the power unit 12 in accordance with an embodiment of the invention. In FIGS. 1 and 3-7, solid lines between components are used to indicate live or hot electrical connections while dashed lines are used to indicate electrical connections through which no power is currently flowing. Cross hatching is also used to show components experiencing a fault or non-operational condition. As depicted in FIG. 1, under normal operational conditions, the traction motors 24 of the power unit 12 are powered by the main generator 16 and the accessories 30 are powered by the APU 18 while the emergency backup generator 20 is unused.

Figure 3:
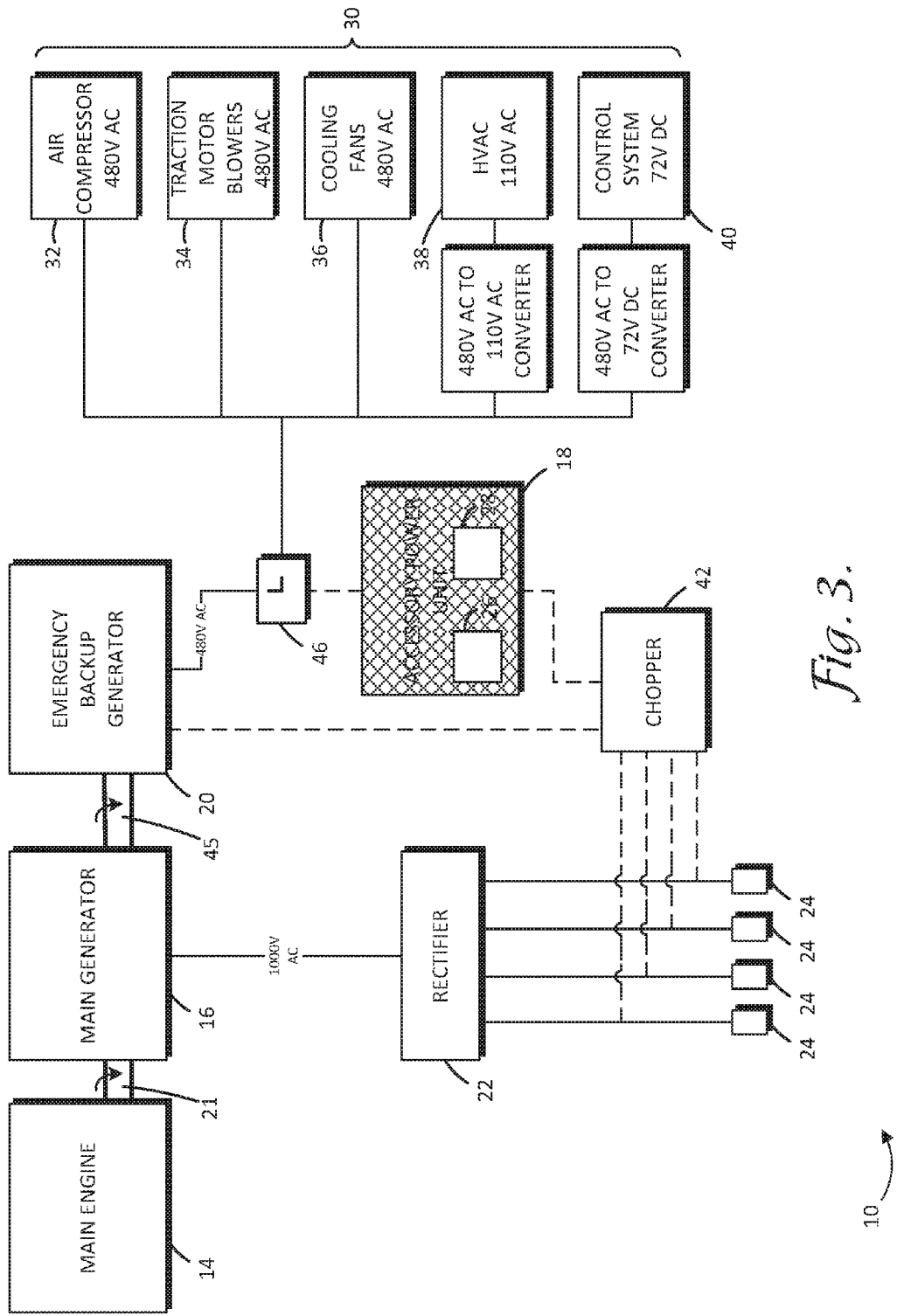
FIG. 3 is a schematic diagram of the backup power system of FIG. 1 operating on a secondary backup power supply due to failure of an accessory power unit depicted in accordance with an embodiment of the invention.

In a first fault condition depicted in FIG. 3, the APU 18 becomes non-operational and the accessories 30 are left without a power supply. The transfer switch 44 is thrown or toggled to electrically couple the backup generator 20 with the accessories 30 and to remove the APU 18 from the primary power supply. The backup generator 20 may thus provide electrical power to the accessories 30 while maintenance or repairs are performed on the APU 18. When the APU 18 is brought back online, the transfer switch 44 may be toggled back to its original position to electrically re-couple the APU 18 with the primary power supply circuit.

Figure 4:
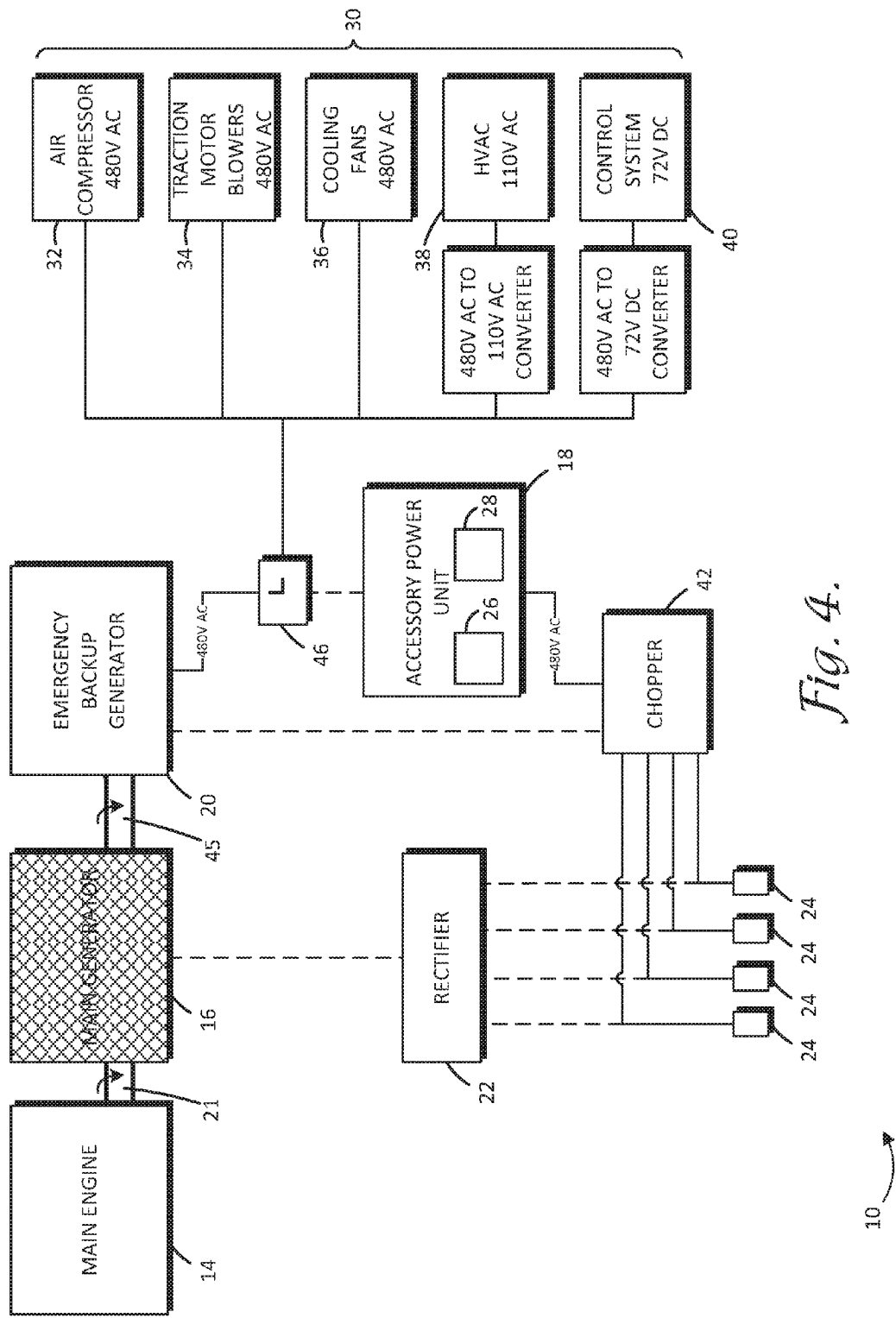
FIG. 4 is a schematic diagram of the backup power system of FIG. 1 operating on a secondary backup power supply due to failure of a main generator depicted in accordance with an embodiment of the invention.
Figure 5:
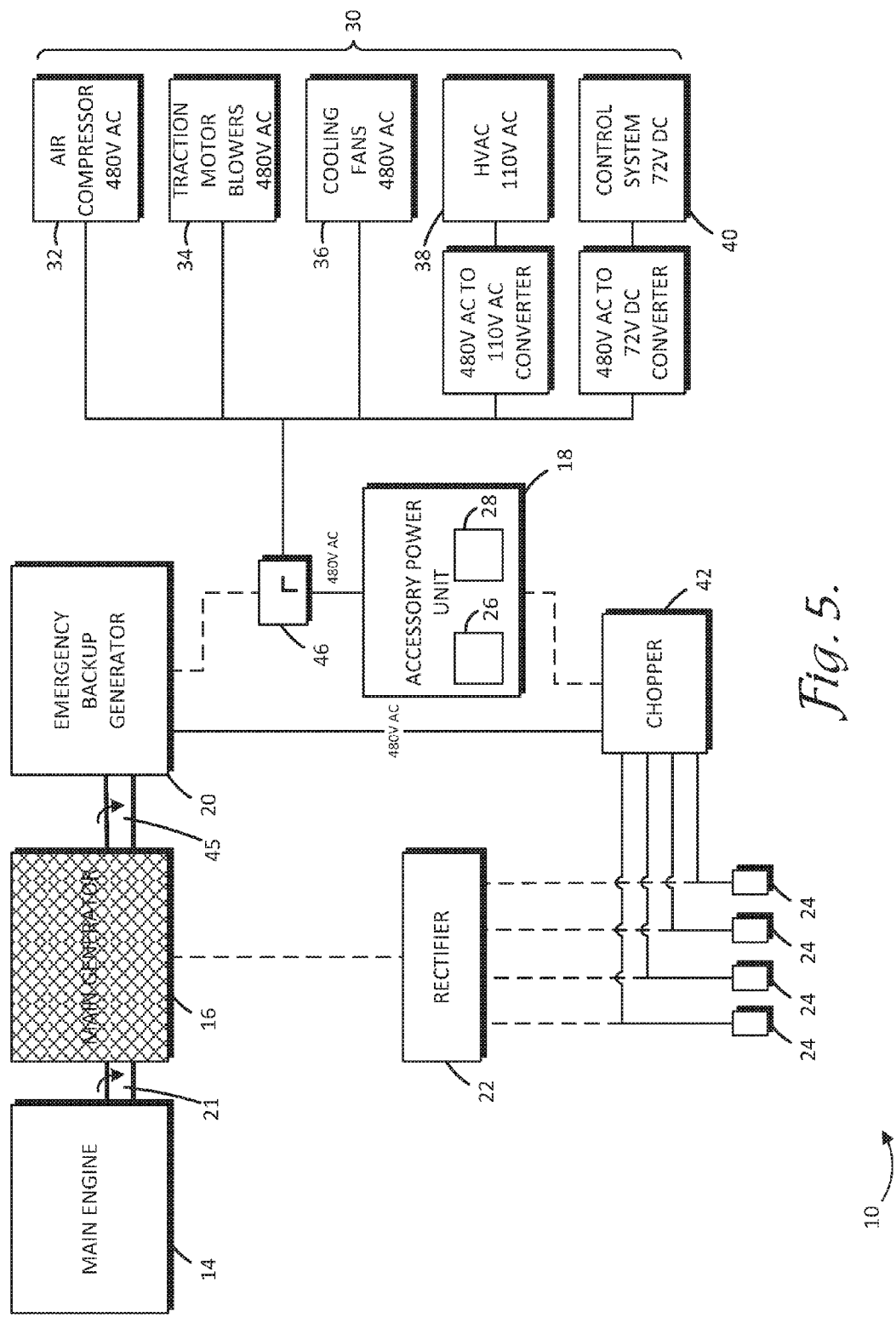
FIG. 5 is a schematic diagram of the backup power system of FIG. 1 operating on a secondary backup power supply in an alternative configuration due to failure of a main generator depicted in accordance with an embodiment of the invention.

In another instance shown in FIG. 4, the main generator 16 becomes inoperable leaving the traction motors 24 without power. The transfer switch 46 is thrown to connect the backup generator 20 to the accessories 30. The power provided by the APU 18 is diverted from the accessories 30 to the traction motors 24 to at least partially power the traction motors 24. The power unit 12 can thus be driven at least at partial operational speeds to a location at which repairs can be made while also having fully functional accessories 30. Alternatively, when the main generator 16 becomes inoperable, the backup generator 20 may be employed to power the traction motors 24 while the APU 18 continues to power the accessories 30, as shown in FIG. 5.

Figure 6:
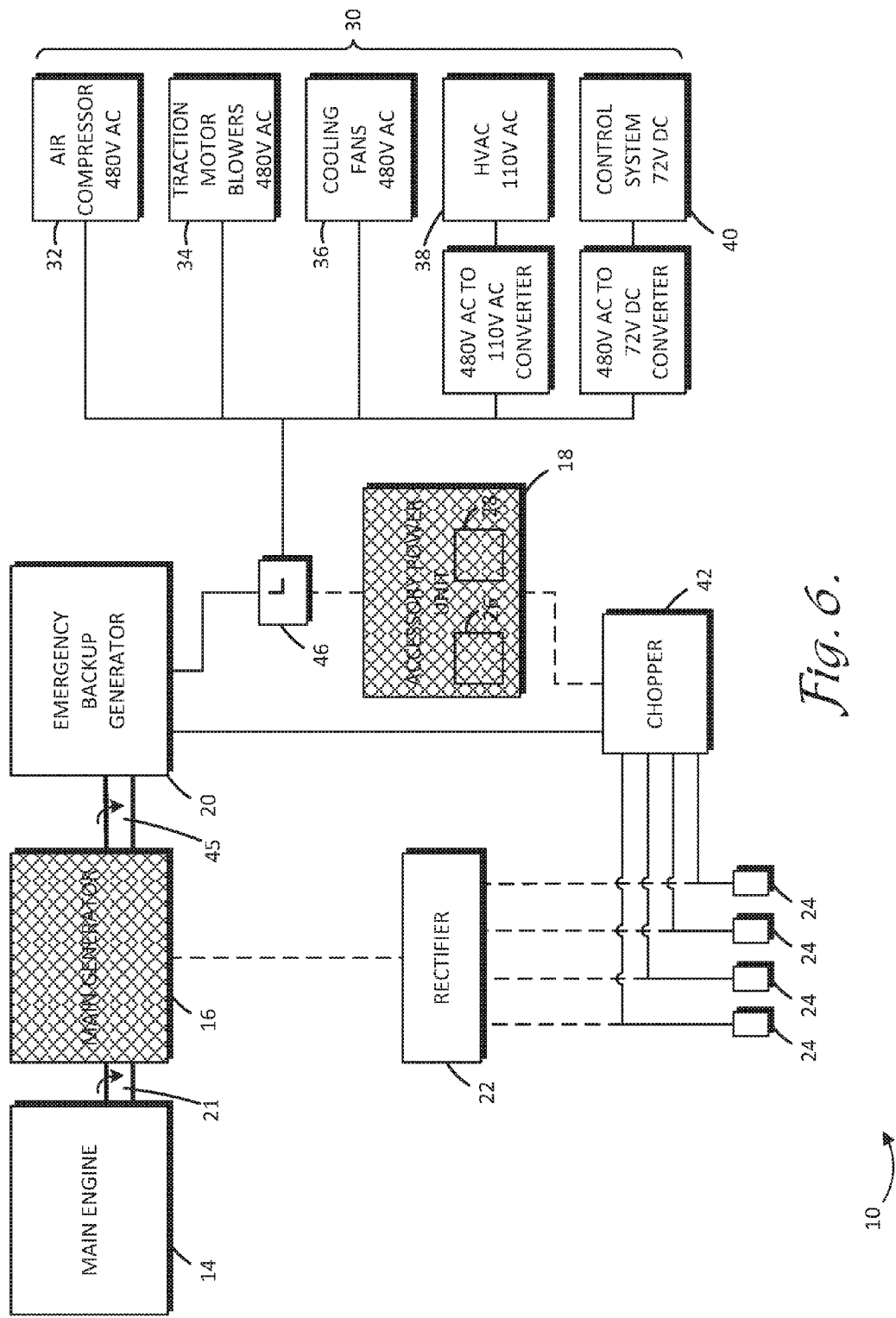
FIG. 6 is a schematic diagram of the backup power system of FIG. 1 operating on a secondary backup power supply due to failure of a main generator and a accessory power unit depicted in accordance with an embodiment of the invention.

In another embodiment, the emergency backup generator 20 is configured to provide power to both the traction motors 24 and to the accessories 30 simultaneously. As depicted in FIG. 6, the power produced by the generator 20 may be shared between the traction motors 24 and the accessories 30, such as when the main generator 16 and the APU 18 are non-operational. The generator 20 may be configured to evenly distribute the power to both the traction motors 24 and the accessories 30 or to unevenly distribute the power supply, e.g. provide a 60/40 distribution or scale the distribution based on the draw of the components.

Figure 7:
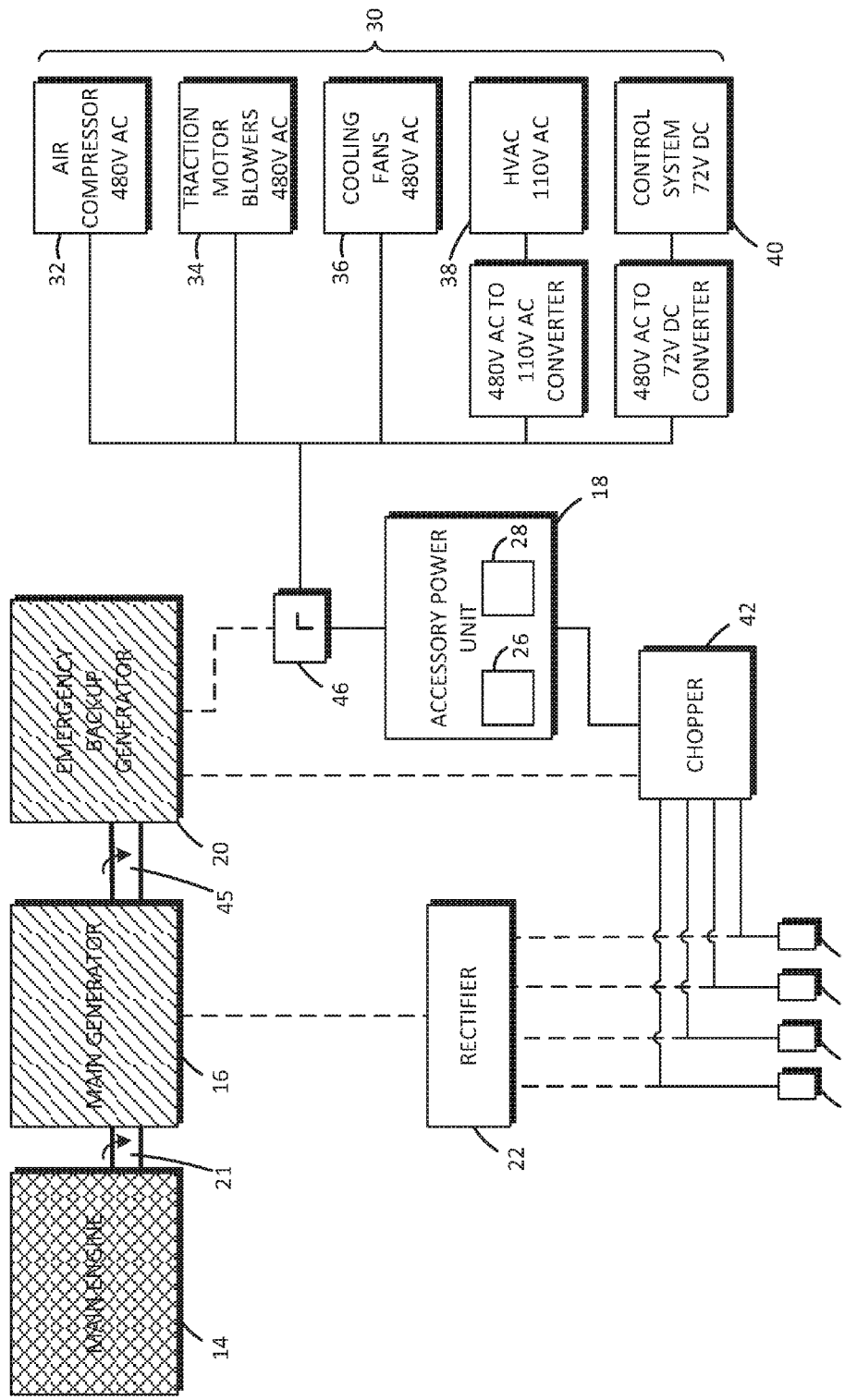
FIG. 7 is a schematic diagram of the backup power system of FIG. 1 operating on power provided by an accessory power unit due to failure of a main engine depicted in accordance with an embodiment of the invention.

In another embodiment depicted in FIG. 7, the APU 18 is configured to provide power to both the traction motors 24 and to the accessories 30 simultaneously, such as when the main engine 14 is inoperable which thus renders the main generator 16 and the emergency backup generator 20 inoperable. This configuration may also be employed when the main generator 16 and the emergency backup generator 20 are inoperable, or when the main generator 16 is inoperable and it is desirable to employ the APU 18 instead of the emergency backup generator 20. The power produced by the APU 18 may be shared between the traction motors 24 and the accessories 30. The APU 18 may be configured to evenly distribute the power to both the traction motors 24 and the accessories 30 or to unevenly distribute the power supply, e.g. provide a 60/40 distribution or scale the distribution based on the draw of the components.

In any of these scenarios, backup power can be automatically initiated upon detection of a fault condition in the primary power supply. Any reconfiguration of the primary power supply circuit needed to supply power to the accessories 30 and the traction motors 24, such as by throwing the transfer switch 46 may also be automatically completed, or can be controlled by an operator of the power unit 12.

A variety of components and their operations are described at a high level herein to illustrate embodiments of the backup power system 10. It is understood that additional and/or alternative components may be employed in embodiments of the invention without departing from the scope described herein. For example, it is understood that a variety of fuses, breakers, switches, converters, transformers, and the like may be employed within the primary and secondary power supply systems and that various additional/alternative accessories 30 may also be employed. It is foreseen that a clutch or similar engagement feature may be employed between the main generator 16 and backup generator 20. Description of these additional/alternative components is not necessary for an understanding of embodiments of the invention and is not provided herein to avoid obscuring the description of embodiments of the invention. Such is not intended to limit the scope of embodiments of the invention in any manner.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Identification of structures as being configured to perform a particular function in this disclosure and in the claims below is intended to be inclusive of structures and arrangements or designs thereof that are within the scope of this disclosure and readily identifiable by one of skill in the art and that can perform the particular function in a similar way. Certain features and sub-combinations are of utility and may be employed without reference to other features and sub-combinations and are contemplated within the scope of the claims.

What is claimed is:

1. A backup power system for a railbound power unit, the system comprising:
   a first engine;
   a first generator operably coupled to the first engine and driven thereby to provide a first source of electrical power;
   an accessory power unit including a second engine operably coupled to a second generator to provide a second source of electrical power;
   a backup generator operably coupleable to the first engine to be driven thereby to provide a third source of electrical power, the third source not being provided when the power unit is in a normal state;
   a propulsion motor operable to propel the power unit, the propulsion motor in the normal state being powered by the first source of electrical power, and in a first fault state being powered by the second source of electrical power, and in a second fault state being powered by the first source of electrical power; and
   a plurality of accessories disposed on one of the power unit and a rail car coupled to the power unit, the accessories in the normal state being powered by the second source of electrical power, and in the first and second fault states being powered by the third source of electrical power,
   wherein in the first fault state the first generator is rendered inoperable while the accessory power unit and the backup generator remain operable, and in the second fault state the accessory power unit is rendered inoperable while the first generator and the backup generator remain operable.

2. The backup power system of claim 1, further comprising:
   a transfer switch configured to selectively electrically couple the accessories with one of the accessory power unit and the backup generator, in the normal state the transfer switch electrically coupling the accessories with the accessory power unit.

3. The backup power system of claim 2, wherein in the first and second fault states the transfer switch is toggled to electrically couple the backup generator with the accessories.

4. The backup power system of claim 1, wherein in a third fault state the main engine is inoperable rendering the first generator and the backup generator inoperable, and wherein the accessory power unit provides the second source of electrical power to one or both of the accessories and the propulsion motor.

5. The backup power system of claim 1, wherein in a fourth fault state the first generator and the accessory power unit are inoperable, and wherein the backup generator provides the third source of electrical power to one or both of the accessories and the propulsion motor.

6. The backup power system of claim 1, wherein the propulsion motor is a traction motor.

7. The backup power system of claim 1, wherein the first engine and the second engine are internal combustion engines.

8. The backup power system of claim 1, wherein one or more of the plurality of accessories are required for operation of the propulsion motor.

9. The backup power system of claim 1, wherein the first engine includes a drive shaft that drives the first generator, and wherein the backup generator is operably coupled to the drive shaft.

10. A backup power system for a railbound power unit, the system comprising:
    a first engine;
    a first generator operably coupled to the first engine and driven thereby to provide a first source of electrical power;
    an accessory power unit including a second engine operably coupled to a second generator to provide a second source of electrical power;
    a backup generator operably coupled to the first engine to be driven thereby to provide a third source of electrical power, the third source not being provided when the power unit is in a normal state;
    a propulsion motor operable to propel the power unit, the propulsion motor in the normal state being powered by the first source of electrical power and in a first fault state being powered by the third supply of electrical power and in a second fault state being powered by the first supply of electrical power; and
    a plurality of accessories disposed on one of the power unit and a rail car coupled to the power unit, the accessories in the normal state and the first fault state being powered by the second source of electrical power and in the second fault states being powered by the third source of electrical power, wherein in the first fault state the first generator is rendered inoperable while the accessory power unit and the backup generator remain operable, and in the second fault state the accessory power unit is rendered inoperable while the first generator and the backup generator remain operable.

11. A backup power system for a railbound power unit, the system comprising:

a first generator operably coupled to and driven by a first engine to provide a first source of electrical power that drives a propulsion motor for the power unit;

an accessory power unit including a second engine operably coupled to a second generator that provides a second source of electrical power that powers a plurality of accessories disposed on one of the power unit and a rail car coupled to the power unit; and a backup generator operably coupleable to the first engine to be driven thereby to provide a third source of electrical power, the third source not being provided when the first generator and the accessory power unit are operable.

12. The backup power unit of claim 11, wherein the backup generator is operably coupled to the first engine and is driven thereby to provide the third source to the accessories when the first generator is inoperable, the second source from the accessory power unit being provided to the propulsion motor.

13. The backup power unit of claim 11, wherein the backup generator is operably coupled to the first engine and is driven thereby to provide the third source to the propulsion motor when the first generator is inoperable, the second source from the accessory power unit being provided to the accessories.

14. The backup power unit of claim 11, wherein the backup generator is operably coupled to the first engine and is driven thereby to provide the third source to the accessories when the accessory power unit is inoperable, the first source being provided to the propulsion motor.

* * * * *